W. B. BARRY, Jr.
PROTECTOR FOR LUBRICATING CUPS.
APPLICATION FILED OCT. 9, 1919.
1,379,609. Patented May 31, 1921.
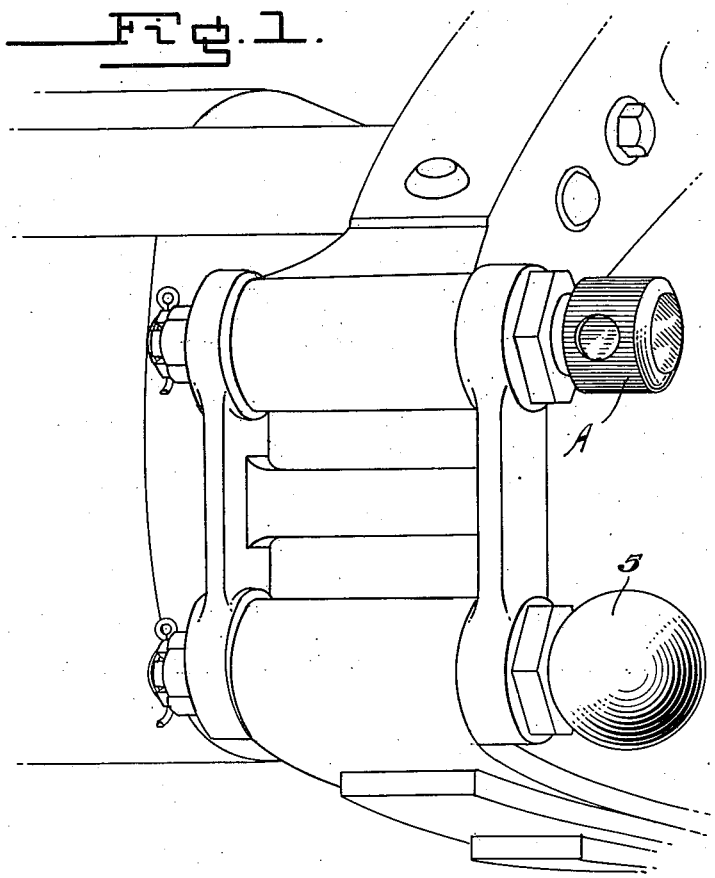
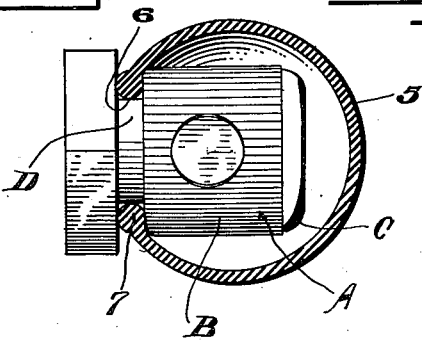
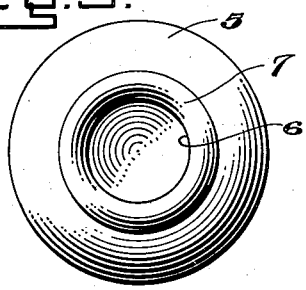
Inventor
William B. Barry Jr.

UNITED STATES PATENT OFFICE.

WILLIAM B. BARRY, JR., OF EAST ORANGE, NEW JERSEY.

PROTECTOR FOR LUBRICATING-CUPS.

1,379,609.　　　　　Specification of Letters Patent.　　Patented May 31, 1921.

Application filed October 9, 1919. Serial No. 329,589.

*To all whom it may concern:*

Be it known that I, WILLIAM B. BARRY, Jr., a citizen of the United States, residing at East Orange, in the county of Essex and State of New Jersey, have invented certain new and useful Improvements in Protectors for Lubricating-Cups, of which the following is a specification.

This invention relates to a protector for oil cups, such as used upon motor vehicles, and an object of the invention is to provide such a protector which can be easily and conveniently mounted over or removed from oil cups to prevent the accumulation of dust, grit or other foreign matter upon the cups.

During travel of the motor vehicles, considerable dust and grit settles upon the oil cups thereof, particularly those upon the shackles of the spring structure, and gradually work about the oil cups entering the interior thereof through the oil receiving openings, particularly when filling the cups with oil, and admixes with the oil being delivered therewith to the bearings, resulting in excessive wear upon the bearings and cutting thereof, and it is an object of this invention to provide a protector for such oil cups which is substantially spherical in shape, being constructed of rubber or analogous material and having an opening therein which is reinforced by an annular bead, which opening permits the mounting of the protector over the oil cup, and so that the bead thereof will engage against the inner end of the rotatable portion of the oil cup and against the oil feeding stem of the cup to securely hold the protector in place against accidental movement relative to the cup, and which protector owing to the elasticity may be mounted about or removed from about the oil cup easily, when it is desired to fill the same, and during the removal of the protector, the annular bead thereon passing over the outer surface of the oil cup will remove practically all surplus oil therefrom, leaving the oil cup comparatively clean, and the protector will also prevent dust or grit or other foreign matter from settling upon the cup during travel of the motor vehicle, or operation of the machine which carries the oil cup.

Other objects of the invention will appear in the following detailed description taken in connection with the accompanying drawing, forming a part of this specification, and in which drawing:

Figure 1 is a perspective view of one of the improved protectors showing it mounted over one of the oil cups carried by the spring shackle of a motor vehicle.

Fig. 2 is a sectional view through the protector showing it mounted about an oil cup, and Fig. 3 is a front elevation of the protector.

The oil cups of motor vehicles, and also of various types of machinery are often subjected to dust, grit or other foreign matter, which settles thereon, and as shown in Fig. 1 of the drawings, the improved protector 5 is mounted about an oil cup to prevent this settlement from the dust or other foreign matter thereon and its consequent working into the interior of the cup. This protector 5 is substantially spherical in shape being constructed of resilient or elastic rubber or analogous material and it is provided with an opening 6 therein to permit it to be mounted about the oil cup A. This opening 6 is reinforced by an annular bead 7, which when mounted about one of the oil cups A of a motor vehicle or an oil cup of similar structure, comprising a rotatable main body portion B which has its outer end rounded as shown at C and which also includes the lubricant or oil feeding stem D, engages beneath the inner end of the rotary body portion C and above the oil feeding stem D to securely hold the protector 5 in place.

In mounting the improved spherical protector B about an oil cup it is necessary to compress the oil cup at the major axis or diameter thereof transversely to the diameter which will extend axially through the opening 6 to sufficiently spread this opening 6 to be slipped over the oil cup A, and during the mounting of the protector upon the oil cup A, the curved or rounded corner C will serve as a guide to facilitate the passage of the reinforcing bead 7, over the body of the oil cup. These protectors 5 may be made of any colored material to harmonize with the color of the machine upon which they are mounted. While in the foregoing description, and in the drawings, the protector has been referred to and illustrated as applicable for protecting the oil cups of motor vehicles, it is to be understood that these protectors may be used for protecting the oil cups used on any type of machine for preventing the accumulation of foreign matter upon the exterior of the cup which foreign matter has a tendency to work into the interior of the cup through the oil receiving openings thereof, and admix with the oil and consequently be fed to the bearings where it causes excessive wear upon the bearings.

While in the drawings the protector 5 is illustrated as substantially spherical in shape it is to be understood that it may be made oval shaped or any other shape if desired to properly encompass the specific type of oil cup upon which it is to be mounted.

While in the foregoing description the protector has been generally described as applicable for protecting oil cups, it is to be understood that it will serve equally as well and is to be employed upon grease or hard oil cups or any other analogous structure without departing from the spirit of this invention.

I claim:

1. A protector for lubricating cups comprising an elastic globular body having an opening in one side of reduced diameter, and provided at the marginal edge of said opening with a reinforcing and resisting bead, said globular body being adapted to be fitted over a lubricating cup and said annular bead being adapted to bind about the stem of said lubricating cup.

2. A protector for lubricating cups comprising a flexible hollow body adapted to fit over a lubricating cup and having an opening in one end through which said cup may be introduced and removed with respect to the hollow body, said hollow body having a resilient bead at the marginal edge of said opening adapted to bind about the stem of the cup for yieldingly holding the flexible body on the cup and for excluding dust and foreign substances from the interior of the body.

WILLIAM B. BARRY, Jr.

Witness:
HERBERT RUMRILL.